United States Patent [19]

Garbo

[11] 3,855,120

[45] Dec. 17, 1974

[54] OXYGENATION OF WASTE WATER

[76] Inventor: Paul W. Garbo, 48 Lester Ave., Freeport, N.Y. 11520

[22] Filed: July 5, 1973

[21] Appl. No.: 376,607

Related U.S. Application Data

[63] Continuation of Ser. No. 161,167, July 9, 1971, abandoned.

[52] U.S. Cl................. 210/3, 210/14, 210/17, 210/20
[51] Int. Cl.............................................. C02c 1/02
[58] Field of Search........... 210/17, 19, 20, 63, 150, 210/151, 3, 14–16, 194, 204, 209, 218, 220, 221; 23/288 S; 201/31; 252/417; 260/702; 261/94–99

[56] References Cited
UNITED STATES PATENTS

| | | | |
|---|---|---|---|
| 2,200,580 | 5/1940 | Pruss et al. | 210/17 |
| 3,232,434 | 2/1966 | Albersmeyer | 210/17 X |
| 3,356,609 | 12/1967 | Bruemmer | 210/7 |
| 3,442,802 | 5/1969 | Hamilton et al. | 210/63 |
| 3,563,888 | 2/1971 | Klock | 210/150 X |

OTHER PUBLICATIONS

Weber et al., "Expanded–Bed Adsorption of Sewage Effluents," Chemical Engineering Progress Symposium Series, No. 107, Vol. 67, pp. 541–553, (1970).

Weber et al., "Physicochemical Treatment of Waste Water," Journal of Water Pollution Control Federation, Vol. 42, No. 1, January, 1970, pp. 83–99.

St. Amant et al., "Treatment of High Nitrate Waters," Jour. AWWA, December, 1969, pp. 659–662.

Primary Examiner—Thomas G. Wyse

[57] ABSTRACT

Sewage or other waste water is passed together with oxygen-containing gas upwardly through a turbulent mass of solid contact particles. The randomly moving contact particles such as coarse sand collide with the pollution solids and effect a fine dispersion of the oxygenating gas throughout the liquid suspension. The pollution solids are thus subjected to attrition by the turbulent mass of contact particles. The fine dispersion of oxygenating gas makes intimate contact with the suspended solids and dissolved solids of the sewage or waste water with the result that its oxygenation is accelerated.

19 Claims, 2 Drawing Figures

PATENTED DEC 17 1974　　　　　3,855,120

INVENTOR.
Paul W. Garbo

OXYGENATION OF WASTE WATER

BACKGROUND OF THE INVENTION

This application is a continuation of application Ser. No. 161,167, filed July 9, 1971, which is now abandoned.

The purification of sewage by the activated sludge process is widely practiced in a variety of sewage systems. Moreover, numerous proposals have been made to improve the activated sludge process by using oxygen-enriched air in lieu of air. However, the use of oxygen has thus far been limited by high operating costs largely attributable to poor biochemical consumption of the oxygen.

In spite of the many studies that have been made to improve the efficiency of the activated sludge process and to decrease the costs of sewage treatment, efforts are constantly being made to find better treatment systems and to reduce the expense of sewage purification.

Illustrative of recent development in the oxygenation of sewage is U.S. Pat. No. 3,547,811 to J. R. McWhirter, disclosing the treatment of sewage with a gas that has at least 50% by volume of oxygen. Even this latest proposal involves a stepwise introduction of the oxygenating gas and an elaborate cycle control apparatus to monitor the reaction and to operate feed gas and vent gas valves.

Another recent proposal is presented in U.S. Pat. No. 3,567,629 to K. C. Ayers, et al., and involves recirculating sewage from an aerobic lagoon through a trickling filter so that effluent from the filter is mixed with raw sewage entering the lagoon. Agitation to insure thorough mixing of the raw sewage, the filter effluent and the liquid in the lagoon is provided to improve the purification of the sewage.

In spite of the many proposals for the treatment of sewage and other waste waters such as those of pulp and paper mills and of food processing plants, none has been widely applied commercially because of such deterrents as high capital investment, high power consumption and limited oxygenation efficiency.

Accordingly, a principal object of this invention is to provide an improved system for treating sewage and other waste waters, which may be collectively called BOD-containing water because of the Biochemical Oxygen Demand of such sewage or other waste water, with a fine and uniform dispersion of oxygen-containing gas bubbles.

Another object is to achieve such improved biochemical oxygenation of BOD-containing water with comparatively simple and economical apparatus.

A further object is to provide a treatment system for BOD-containing water in which oxygen enrichment of the oxygenating gas is commercially attractive.

These and other objects and advantages of the invention will be evident from the description which follows.

SUMMARY OF THE INVENTION

In accordance with this invention, BOD-containing water and oxygen-containing gas are simultaneously passed upwardly through a mass of solid contact particles at a rate to maintain the contact particles in a suspended and agitated state without effecting transport of contact particles away from the resulting expanded and turbulent mass of randomly moving contact particles. In other words, the upflowing waste water and oxygenating gas pass through a turbulent mass of the contact particles which remain in a desired or predetermined contact zone. The contact zone also contains bacterial solids or active biomass suspended in the liquid therein.

While the efficiency of oxygen consumption in the oxygenation of BOD-containing water pursuant to this invention depends in large measure on uniformly dispersing the oxygenating gas in the form of fine or tiny bubbles throughout the water, the rate at which thhe oxygenating gas is introduced into the contact zone should not greatly exceed the rate of biochemical consumption of oxygen by the water flowing up through the contact zone. Obviously, an excessive flow of oxygenating gas through the contact zone not only is wasteful of oxygenating gas but also decreases the amount of water in the contact zone and, therefore, reduces the residence time of the water passing through the contact zone.

On the other hand, the flow rate of waste water up through the contact zone must be controlled so that, together with the selected upflow rate of oxygenating gas, the solid particles of the contact mass will be suspended and agitated to disperse the gas uniformly throughout the water as tiny bubbles. The resulting expanded and turbuent mass of contact particles should occupy a volume that is at least about 10% greater than the volume occupied by the mass of particles when in a settled and stationary state. In most cases, the expanded volume of the turbulent contact mass will not be more than about double the volume of the settled mass. Preferably, the expanded volume of the turbulent contact mass is in the range of about 20% to 60% greater than the volume of the settled mass.

The solid contact particles may be sand, alumina, feldspar, granite, hematite, slag, coke, glass or any hard material with a specific gravity of at least 2.0 which is substantially insoluble in the waste water passed through the turbulent mass thereof. The contact particles which may be in the form of chips, beads, pellets, shot and the like will rarely have a maximum dimension exceeding 10 millimeters. In most cases, the contact particles will be of a size passing through Sieve No. 3 but retained on Sieve No. 60 of the U.S. Sieve Series. Preferably, the contact particles are in the size range of particles passing through Sieve No. 6 but retained on Sieve No. 30 of the U.S. Sieve Series.

The upward flow rate of the waste water through the contact zone is adjusted in relation to several process factors such as the size and specific gravity of the contact particles used, the density and viscosity of the waste water and oxygenating gas, the selected upflow rate of oxygenating gas, and the desired expansion and turbulence of the mass of contact particles. Generally, a waste water flow rate in the range of about 10 to 200 gallons per minute per square foot of the horizontal cross-section of the contact zone will give the desired expansion and turbulence of the mass of solid contact particles therein. With very small contact particles of comparatively low specific gravity, the water flow rate may be as low as 5 gallons per minute per square foot of the horizontal cross-section of the contact zone, while with large contact particles of high specific gravity that flow rate may be as high as 500 gallons per minute per square foot. The preferred range of waste water flow is 25 to 125 gallons per minute per square foot of horizontal cross-section of the turbulent contact mass.

To maintain a selected waste water flow rate up through the contact zone and at the same time achieve the desired biochemical purification of the water, the height of the contact zone may be inordinately high if the waste water is to pass only once through the contact zone. Accordingly, it is often advisable to recycle part of the water leaving the top of the contact zone holding the turbulent mass of contact particles back to the bottom thereof where raw or untreated waste water is introduced. The liquid recycle ratio (ratio of the volume of treated water returned to the bottom of the contact zone to the volume of raw waste water fed to the contact zone) may occasionally be as much as 20 or higher but in most cases will not exceed about 10 in normal continuous operation.

While air may be used as the oxygenating gas, the process of this invention is particularly suitable for the use of oxygen-enriched air or even substantially pure oxygen. It is known that the fractionation of air involves minimum energy consumption when a fraction of 60 to 80% by volume of oxygen is produced. U.S. Pat. Nos. 3,209,548 and 3,257,814 disclose air fractionation processes producing oxygen of approximately 70% by volume purity and such oxygen is advantageously used as the oxygenating gas in the process of this invention. When oxygen of at least about 60% by volume purity is used, it is often advisable to maintain the contact zone at elevated pressure. For reasonable compression costs, the pressure of the oxygenating gas will usually not exceed about 75 p.s.i.g. (pounds per square inch gauge). In some cases, oxygen of at least 95% by volume purity may justify compression to a higher pressure.

When the oxygenating gas is richer than air in oxygen content, the recycling of gas leaving the top of the contact zone back to the bottom of the zone may be advisable to achieve more economic consumption of the oxygen in the gas. Compared to the liquid recycle ratio, the gas recycle ratio (ratio of the volume of gas leaving the contact zone returned to the bottom of the zone to the volume of fresh oxygenating gas fed to the zone) is generally much smaller and in most cases will not exceed about 5 in normal continuous operation.

BRIEF DESCRIPTION OF THE DRAWINGS

Further clarification of the invention and its advantages will become apparent from the description which is presented in relation to the accompanying drawings of which.

DESCRIPTION OF PREFERRED EMBODIMENTS

Figure 1:
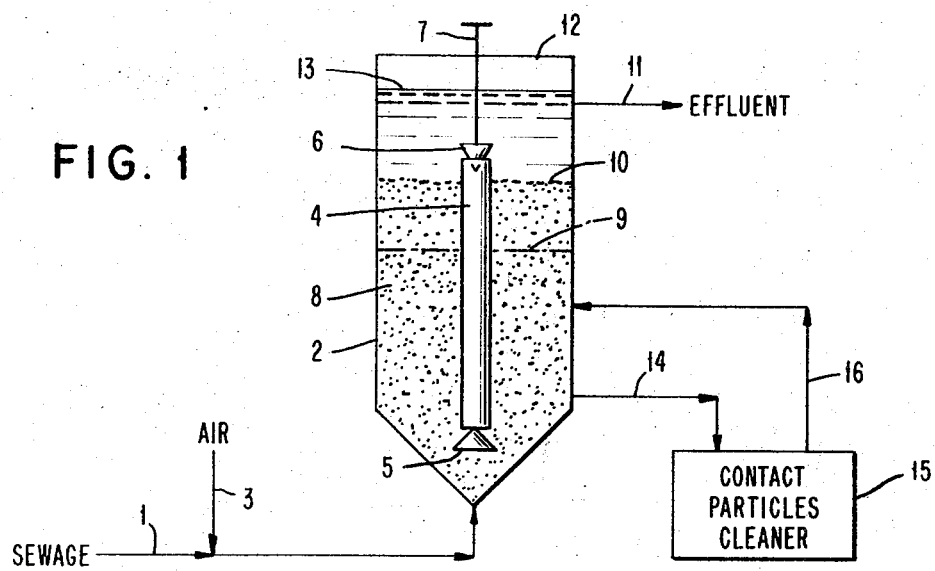
FIG. 1 is a diagrammatic view of a cross-sectional elevation of an apparatus open to the atmosphere which is used in one embodiment of the invention.

Referring to FIG. 1, sewage or other BOD-containing water is pumped through line 1 into the conical bottom of aeration tank 2 while air is pumped through line 3 into line 1 for discharge into the bottom of tank 2. Aeration tank 2 is provided with open-ended standpipe 4 having conical baffle 5 adjacent its lower end and conical plug 6 at its upper end. Plug 6 is mounted on the bottom end of rod 7 which is vertically movable; by raising or lowering plug 6, the volume of liquid flowing down through standpipe 4 may be controlled as will soon be described.

Tank 2 contains a mass of solid contact particles 8 which fills tank 2 to level 9 when in a settled and stationary state. However, when the sewage and air are flowing up through tank 2 pursuant to this invention to effect expansion and turbulence of the contact mass, the randomly moving solid particles 8 fill tank 2 to level 10. Line 11 connected close to the top open end 12 of tank 2 is used to discharge the treated or purified water. The residual or unconsumed portion of the air fed by line 3 and gases generated by the biochemical degradation of the sewage become separated from the treated water at its top surface 13 and escape into the atmosphere.

Air introduced from line 3 is uniformly dispersed in tank 2 as tiny bubbles throughout the water by the turbulent mass of contact particles 8. This aeration reduces the density of the water surrounding standpipe 4. Inasmuch as conical baffle 5 deflects air away from the bottom end of standpipe 4, the unaerated water in standpipe 4 has a higher density than that of the aerated water and there is a natural flow of water downwardly through standpipe 4. Thus, part of the treated water is automatically recycled from the top of tank 2 through standpipe 4 to the bottom of tank 2. The liquid recycle ratio is controlled by adjusting the position of conical plug 6 in the upper end of standpipe 4 by means of rod 7. The volume of recycled liquid can be varied from zero when plug 6 is fully inserted in standpipe 4 to the maximum capacity of standpipe 4 when plug 6 is completely withdrawn from standpipe 4. This natural recycling of water resulting simply from the aeration of the water in the contact zone is suitable for sewage treatment systems designed to operate with a small liquid recycle ratio, usually less than 2.

The sewage introduced by line 1 into aeration tank 2 may cause the accumulation of pollution solids or solid degradation products within the turbulent mass of contact particles 8. Before excessive accumulation of such solids can interfere with proper operation, a portion of the turbulent mass of contact particles 8 is withdrawn from tank 2 through line 14 and conveyed to cleaning apparatus 15. The total solids entering apparatus 15 may be washed, exposed to combustion to eliminate combustible matter, screened to discard very fine particles or treated in any other way that will eliminate undesired material from contact particles 8. Cleaned contact particles 8 may be suspended in water and conveyed through line 16 back into tank 2. Alternatively, cleaned contact particles 8 may be lifted mechanically and dropped into tank 2 through top open end 12. The withdrawal of dirty contact particles 8 from tank 2 and the return of clean contact particles 8 to tank 2 may be carried out continuously or periodically depending on the rate of accumulation of undesired solid materials in the turbulent mass of contact particles 8 for each BOD-containing water fed into tank 2.

Figure 2:
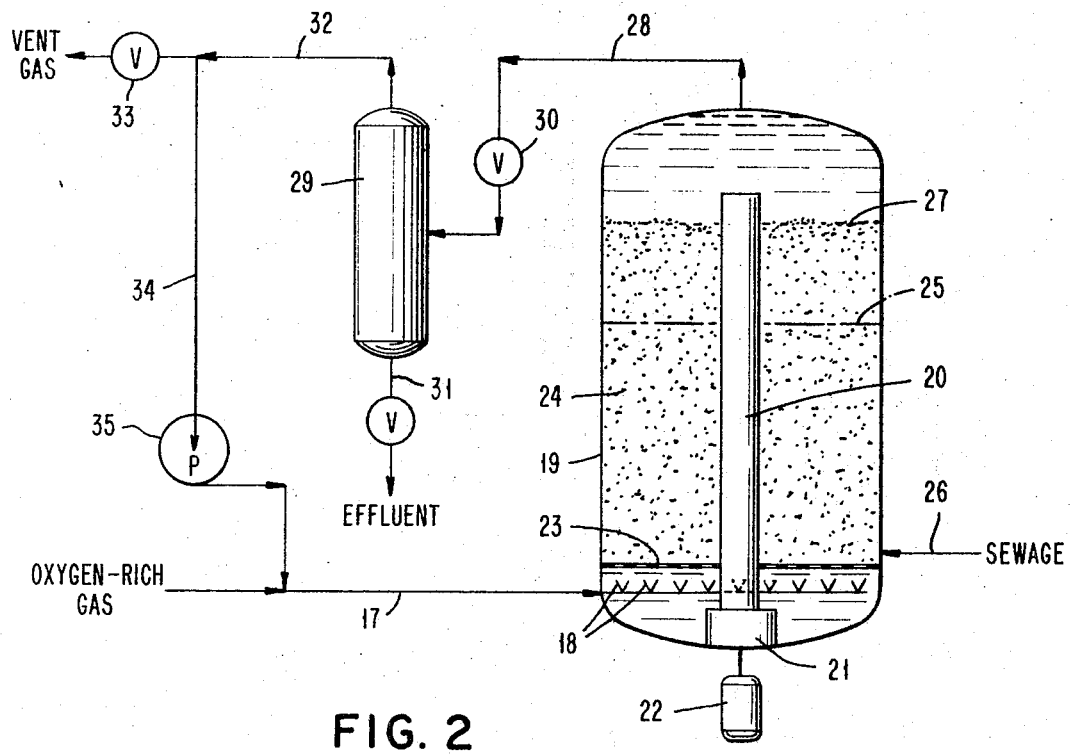
FIG. 2 is a similar view of pressurized apparatus used in another embodiment of the invention.

Referring to FIG. 2, oxygen of about 70% by volume purity is compressed to a pressure of 65 p.s.i.g. and passed through line 17 to distributor 18 in the bottom of aeration vessel 19. Standpipe 20 has its bottom end connected to recirculation pump 21 in the bottom of vessel 19. Motor 22 outside vessel 19 is connected to and drives a pump 21. Screen 23 near the bottom of vessel 19 extends horizontally over the entire annular area between standpipe 20 and vessel 19. A mass of solid contact particles 24 surrounds standpipe 20 above screen 23 and has a top level 25 when in a fully settled state. BOD-containing water is introduced through line 26 into vessel 19 just above screen 23. The selected rates of water introduced by line 26 and recycled by pump 21 together with the rate of oxygenating gas entering vessel 19 through distributor 18 effect expansion and turbulence of the mass of contact particles 24 so that the randomly moving contact particles 24 now fill vessel 19 to level 27. The operation of pump 21 can be regulated to vary the liquid recycle ratio over a desired broad range.

Liquid and gas becoming disengaged from the turbulent mass of contact particles 24 rise into line 28 and thence discharge into separator 29. Valve 30 in line 28 is used to reduce the pressure of the liquid and gas mixture flowing through line 28. By maintaining separator 29 at an elevated pressure below the pressure in vessel 19, say about 10 to 15 p.s.i.g. lower, the separation of liquid and gas is improved. Liquid is discharged from separator 29 through valved line 31 as purified effluent. Gas leaves separator 29 through line 32 and is partially vented through valve 33 to the atmosphere. Part of the gas in line 32 is recycled through line 34 and compressor 35 into line 17 which discharges the oxygenating gas into vessel 19 by way of distributor 18. Regulation of valve 33 and compressor 35 permits variation of the gas recycle ratio over a desired wide range. Of course, compressor 35 is eliminated when none of the gas leaving separator 29 is to be recycled to vessel 19 and in such case separator 29 can be operated at atmospheric pressure. Maintaining elevated pressure in separator 29 is only of value when gas is recycled to vessel 19 maintained at higher pressure because then the consumption of energy at compressor 35 is minimized.

Vessel 19 may be provided with apparatus for cleaning dirty contact particles 24 as shown by unit 15 in FIG. 1.

Generally, the aeration tank or vessel is designed to hold a turbulent mass of contact particles having a height of about 15 to 30 feet although turbulent masses of appreciably less or greater height are in some cases justified.

In an illustrative operation of the treatment system shown in FIG. 1, sanitary sewage of a suburban community, after being screened to remove coarse particles, is supplied to aeration tank 2 by line 1 while air is introduced by line 3. Sand particles passing through Sieve No. 8 and retained on Sieve No. 20 of the U.S. Sieve Series provide the contact mass in tank 2 which in the expanded and turbulent state has a height of 26 feet. With a liquid recycle ratio of 0.8 effected by returning treated water through standpipe 4 to the bottom of tank 2, the upflow rate of water is 12 gallons per minute per square foot of the horizontal cross-section of the turbulent contact mass. The air rate up through tank 2 together with the upflow rate of water expands the contact mass so that its volume is about 22% greater than the volume of the settled mass. Treated water withdrawn from tank 2 through line 11 is ready for discharge in a river.

Many variations and modifications of the invention will be apparent to those skilled in the art without departing from the spirit or scope of the invention. For example, while an internal standpipe has been shown in FIGS. 1 and 2 for recycling liquid in the aeration vessel, an external pipe with its opposite ends connected to the top and bottom portions of the vessel may be used instead. Two or more aeration vessels may be connected in series so that the treated liquid leaving the top of one vessel enters the bottom of the next vessel for further treatment. The oxygenating gas may in such case be passed serially through the connected vessels in a direction counter to the progress of water from one vessel to the next. When a series of aeration vessels is used, the recycling of liquid and gas in each vessel may be eliminated with the result that the equipment is simplified for once-through continuous flow of the waste water. Further, while the operations of the treatment systems of FIGS. 1 and 2 have been described for continuous feeding of BOD-containing water and continuous discharge of purified water, these systems can obviously be operated batchwise 50 that periodically waste water is fed to the aeration vessel, treated for a period of time and then discharged. In such batchwise operation, the recycling of liquid through the contact zone becomes a necessity for maintaining the mass of contact particles in an expanded and turbulent state. Accordingly, only such limitations should be imposed on the invention as are set forth in the appended claims.

What is claimed is:

1. The improved process for treating BOD-containing water by biochemical oxygenation which comprises flowing said BOD-containing water and oxygenating gas simultaneously up through an elongate mass of solid contact particles having a maximum dimension not exceeding 10 millimeters, said mass containing active biomass, regulating the upflow of said BOD-containing water and said oxygenating gas to effect expansion and turbulence of said mass without effecting transport of said solid contact particles away from the expanded and turbulent mass, said expansion of said mass increasing the volume of said mass when in a settled state by at least about 10% but the expanded volume of said mass being not more than double the volume of the settled mass, and said turbulence of said mass causing uniform dispersion of said oxygenating gas as tiny bubbles in said BOD-containing water whereby biochemical oxygenation is achieved, and withdrawing treated water rising above the top of said expanded and turbulent mass of solid contact particles.

2. The process of claim 1 wherein water rising above the top of the expanded and turbulent mass of solid contact particles is recycled to the bottom of said mass for flow up through said mass.

3. The process of claim 1 wherein the water upflow is regulated not to exceed 500 gallons per minute per square foot of horizontal cross-section of the expanded and turbulent mass of solid contact particles.

4. The process of claim 1 wherein the oxygenating gas supplied to said process is richer than air in oxygen content, and gas rising above the top of the expanded and turbulent mass of solid contact particles is recycled to the bottom of said mass for flow up through said mass.

5. The process of claim 1 wherein the oxygenating gas supplied to said process has an oxygen content of at least about 60% by volume, and the BOD-containing water and said oxygenating gas are maintained at elevated pressure higher than hydrostatic pressure while flowing up through the expanded and turbulent mass of solid contact particles.

6. The process of claim 5 wherein water rising above the top of the expanded and turbulent mass of solid contact particles is recycled to the bottom of said mass for flow up through said mass at a rate not exceeding 20 volumes of the recycled water per volume of BOD-containing water being supplied to said process.

7. The improved process for treating BOD-containing water by biochemical oxygenation which comprises continuously supplying said BOD-containing water and oxygenating gas to the bottom of an elongate mass of solid contact particles of a size passing through Sieve No. 3 but retained on Seive No. 60 of the U.S. Seive Series, said mass containing active biomass, regulating the flow of said BOD-containing water and said oxygenating gas up through said mass to effect expansion and turbulence of said mass without effecting transport of said solid contact particles away from the expanded and turbulent mass, said expansion of said mass increasing the volume of said mass when in a settled state by at least about 10% but the expanded volume of said mass being not more than double the volume of the settled mass, and said turbulence of said mass causing uniform dispersion of said oxygenating gas as tiny bubbles in said BOD-containing water whereby biochemical oxygenation is achieved, and continuously withdrawing treated water rising above the top of said expanded and turbulent mass of said contact particles at substantially the same rate at which said BOD-containing water is being supplied to the bottom of said expanded and turbulent mass.

8. The process of claim 7 wherein treated water rising above the top of the expanded and turbulent mass of solid contact particles is recycled to the bottom of said mass for flow up through said mass at a rate not exceeding about 10 volumes of the recycled water per volume of BOD-containing water being supplied to said process, and the water upflow of regulated not to exceed 500 gallons per minute per square foot of horizontal cross-section of said expanded and turbulent mass of solid contact particles.

9. The process of claim 7 wherein the oxygenating gas supplied to said process is richer than air in oxygen content, and the volume of the expanded and turbulent mass of solid contact particles is in the range of about 20% 60% greater than the volume of said mass when in a settled state.

10. The process of claim 7 wherein the oxygenating gas supplied to said process has an oxygen content of at least about 60% by volume, and the BOD-containing water and said oxygenating gas are maintained at elevated pressure higher than hydrostatic pressure while flowing up through the expanded and turbulent mass of solid contact particles.

11. The process of claim 10 wherein treated water rising above the top of the expanded and turbulent mass of solid contact particles is recycled to the bottom of said mass for flow up through said mass at a rate not exceeding about 10 volumes of the recycled water per volume of BOD-containing water being supplied to said process.

12. The process of claim 11 wherein gas rising above the top of the expanded and turbulent mass of solid contact particles is recycled to the bottom of said mass for flow up through said mass at a rate not exceeding about 5 volumes of the recycled gas per volume of the oxygenating gas being supplied to said process.

13. The process of claim 7 wherein solid contact particles with accumulated undesired solid materials are withdrawn from the expanded and turbulent mass thereof, are cleaned to eliminate said undesired solid materials, and then are returned to said mass.

14. The process of claim 7 wherein the solid contact particles are of a size passing through Sieve No. 6 but retained on Sieve No. 30 of the U.S. Seive Series, and the flow of water up through the expanded and turbulent mass of said particles is regulated in the range of about 25 to 125 gallons per minute per square foot of horizontal cross-section of said mass.

15. The process of claim 14 wherein treated water rising above the top of the expanded and turbulent mass of solid contact particles is recycled to the bottom of said mass for flow up through said mass at a rate not exceeding about 10 volumes of the recycled water per volume of BOD-containing water being supplied to said process, the oxygenating gas supplied to said process has an oxygen content of at least about 60% by volume, and the BOD-containing water and said oxygenating gas are maintained at elevated pressure higher than hydrostatic pressure while flowing up through said expanded and turbulent mass of solid contact particles.

16. The improved process for treating BOD-containing water by biochemical oxygenation which comprises continuously supplying said BOD-containing water and oxygenating gas to the bottom of an elongate mass of solid contact particles of a size passing through Seieve No. 3 but retained on Sieve No. 60 of the U.S. Sieve Series, said mass containing active biomass, regulating the flow of said BOD-containing water recycled treated water hereinafter specified and said oxygenating gas up through said mass to effect expansion and turbulence of said mass without effecting transport of said solid contact particles away from the expanded and turbulent mass, said expansion of said mass increasing the volume of said mass when in a settled state by about from 20% to 60%, and said turbulence of said mass causing uniform dispersion of said oxygenating gas as tiny bubbles in said BOD-containing water and said recycled treated water whereby biochemical oxygenation is achieved, passing part of the water rising above the top of said expanded and turbulent mass as the aforesaid recycled treated water downwardly through a standpipe extending to and discharging into the bottom of said expanded and turbulent mass, and continuously withdrawing the remaining part of said water rising above the top of said expanded and turbulent mass as treated water at substantially the same rate at which said BOD-containing water is being supplied to the bottom of said expanded and turbulent mass.

17. The process of claim 16 wherein the solid contact particles are sand particles and the oxygenating gas is supplied to said process at an elevated pressure not exceeding about 75 pounds per square inch gauge and has an oxygen content of at least about 60% by volume.

18. The process of claim 17 wherein the recycled treated water has a volume not exceeding about 10 times the volume of BOD-containing water being supplied to said process, and said BOD-containing water, said recycled treated water and the oxygenating gas are maintained at elevated pressure higher than hydrostatic pressure while flowing up through the expanded and turbulent mass of sand particles.

19. The process of claim 16 wherein the solid contact particles are selected from the group of materials consisting of sand, alumina, feldspar, granite, hematite, slag, coke and glass.

* * * * *

UNITED STATES PATENT OFFICE
CERTIFICATE OF CORRECTION

Patent No. 3,855,120                    Dated December 17, 1974

Inventor(s)  Paul W. Garbo

It is certified that error appears in the above-identified patent and that said Letters Patent are hereby corrected as shown below:

Column 1, line 21, "development" should read -- developments --.

Column 2, line 11, "thhe" should read -- the --.

Column 4, line 48, "material" should read -- materials --.

Column 6, line 12, "Further" should read -- Furthermore --;

line 16, "50" should read -- so --.

Column 7, line 27, "mass of said" should read -- mass of solid --;

line 37, "of regulated" should read -- is regulated --;

line 45, "20% 60%" should read -- 20% to 60% --.

Column 8, line 32, "water recycled" should read -- water, recycled --.

Signed and sealed this 11th day of March 1975.

(SEAL)
Attest:

RUTH C. MASON
Attesting Officer

C. MARSHALL DANN
Commissioner of Patents
and Trademarks